United States Patent [19]
Wagner

[11] Patent Number: 4,774,059
[45] Date of Patent: Sep. 27, 1988

[54] APPARATUS FOR THE FEEDING OF LIQUID SYNTHETIC RESIN COMPONENTS

[75] Inventor: Peter Wagner, Weichs, Fed. Rep. of Germany

[73] Assignee: Krauss-Maffei Aktiengesellschaft, Munich, Fed. Rep. of Germany

[21] Appl. No.: 543,957

[22] Filed: Oct. 20, 1983

[30] Foreign Application Priority Data

Oct. 30, 1982 [DE] Fed. Rep. of Germany ....... 3240296

[51] Int. Cl.⁴ ................................................. B01F 5/10
[52] U.S. Cl. ..................................... 422/131; 222/137; 222/267; 422/135
[58] Field of Search ................ 422/131, 135, 234; 366/136, 159, 267, 269, 604; 252/359 E; 261/DIG. 26; 222/135, 137, 267

[56] References Cited

U.S. PATENT DOCUMENTS 3,960,506  6/1976  Schmitzer ........................... 422/135
4,167,236  9/1979  Taubenmann ..................... 222/334 X

FOREIGN PATENT DOCUMENTS 2823761  2/1979  Fed. Rep. of Germany ...... 422/133

Primary Examiner—Barry S. Richman
Assistant Examiner—William R. Johnson
Attorney, Agent, or Firm—Herbert Dubno

[57] ABSTRACT

A mixing head is supplied with two or more synthetic resin components from respective supply vessels. When one of these components is highly filled and an obstruction may be expected upstream of the metering piston unit between the supply vessel and the mixing head, the recirculating line from the mixing head is connected to the duct between the supply vessel and the piston unit at a position close to a two-way valve at the piston so that recirculating flow clears any obstruction from the duct.

6 Claims, 1 Drawing Sheet

APPARATUS FOR THE FEEDING OF LIQUID SYNTHETIC RESIN COMPONENTS

FIELD OF THE INVENTION

My present invention relates to an apparatus for the feeding of liquid synthetic resin components and, more particularly, to an apparatus for the metering, mixing and recirculation of at least two synthetic resin components and particularly synthetic resin components at least one of which is highly filled, i.e. charged with solid particles.

BACKGROUND OF THE INVENTION

In dealing with apparatus for the feeding of liquid synthetic resin components, reference may be had to the commonly owned U.S. Pat. No. 4,167,236 and the corresponding German Open Application DE-0S No. 26 13 771, as well as patents which may be found in International Class B29B 5/06.

The aforementioned U.S. patent and its corresponding German application describe an apparatus for the metering, mixing and recirculation of at least two mutually interreactive liquid synthetic resin components, at least one of which may be highly charged with solid particles, generally referred to as a filler, pigment or the like.

Systems of this type may be used, for example, for feeding capral lactam components adapted to produce a nylon upon mixing.

Generally speaking, the apparatus can comprise a supply vessel and a metering piston unit for at least one of these components, a mixing head into which the two components are fed for mutual interaction and mixing and from which the mixture is discharged, and means enabling recirculation of the components from the mixing head so that a static condition in the component path is not generated which may lead to obstruction and interference with the regularity of operations.

The metering piston chamber of the metering piston unit is thus connected by a duct on the one hand with the supply vessel and with a duct on the other hand with the mixing head and the duct between the supply vessel and the metering piston unit can have a controllable valve which operates so that, during the suction stroke or intake stroke of the metering piston unit, the respective component will only pass from the supply vessel or will only be drawn into the metering piston chamber from the supply vessel while, during the pressure stroke, this component will only be displaced to the mixing head.

Generally each of the components may be provided with such a supply vessel, metering piston unit and a control arrangement allowing operation in the manner described.

The apparatus of the aforementioned U.S. patent and its German corresponding application operates such that the metering piston unit during a suction stroke draws the respective component via a line from the respective supply vessel. The latter line can include a check valve so that the suction operation is permitted. During the pressure stroke, however, the check valve has a blocking mode so that the respective component is displaced by the metering piston via a line to the mixing head and, depending upon the position of the latter, either enters the mixing chamber and is discharged as part of a reactive mixture, or is blocked from entry into the mixing chamber and is recirculated. In the earlier systems, moreover, the recirculating component was returned to the respective supply vessel.

Generally the metering piston unit of this system is in continuous operation so that practically continuously a portion of the quantity of the component is fed to the mixing chamber during a stroke of the metering piston. There, this portion of the metered component mixes with the second component and the resulting mixture can be discharged into a mold cavity in which the reaction can be completed.

The metering piston unit can also serve to increase the pressure of the component upstream of the mixing chamber and, when caprolactam is fed to the mixing chamber in the production of nylon, this pressure can amount to about 20 bar. In the production of polyurethane, the pressure of the metered polyisocyanate or di-isocyanate component or the pressure of the polyol component can be 200 bar upstream of the mixing chamber.

Especially when at least one of these components is highly filled, i.e. contains a high proportion of a solid filler, e.g. glass fibers to serve as a reinforcement in the resulting synthetic resin, a significant disadvantage arises in that the line between the supply vessel and the metering piston unit for the highly filled component tends to become clogged. The contents of this line is subjected only during the suction stroke to a comparatively low suction pressure which does not always free the obstruction. The problem is especially pronounced when a comparatively low pressure, say the 20 bar required for caprolactam, is generated at the inlet to the mixing chamber. In this case, the suction pressure can be a maximum of 0.4 bar in practice.

OBJECTS OF THE INVENTION

It is the principle object of the present invention to provide an improved apparatus for the feeding of liquid synthetic resin components, especially two reactive components at least one of which may be highly filled, in systems of the type described, wherein the aforementioned disadvantage does not arise.

Another object of this invention is to provide an improved apparatus in which the clogging or plugging of the suction line of the highly filled liquid component can be avoided or is not as significant a problem.

Still another object of the invention is to provide an improved apparatus for the feeding of liquid synthetic resin components which increases the versatility of the system described in U.S. Pat. No. 4,167,236 and the corresponding German application.

SUMMARY OF THE INVENTION

These objects and others which will become apparent hereinafter are attained, in accordance with the present invention, by providing between the supply vessel and the metering piston unit or chamber of the metering piston unit, only a single line or duct, connecting the recycling or recirculation line or duct from the mixing head to this single line or duct, and providing a control valve or like element in the portion of the line or duct between the opening of the latter recirculating line into this duct and the metering piston chamber.

According to the invention, therefore, instead of opening into the supply vessel directly, the recirculating line for the or each component opens into the suction line connecting the metering piston unit with the supply vessel and preferably this opening is as close as possible to the point at which the line communicates with the metering piston chamber. In the space between the point at which the line opens into the metering piston chamber and the point at which the recirculating line opens into the passage or duct communicating between the supply vessel and the metering piston chamber, therefore, a valve is provided so that this duct can be blocked upstream of the metering piston unit.

According to a feature of the invention the recirculating line connection to the suction line and the valve are provided in the region of the metering piston chamber of the metering piston unit and preferably at the bottom of this unit.

Since practically always there is a partial recirculation of the heavily filled component from the metering piston unit while the latter is in its pressure or discharge phase of operation, this recycled portion can serve to apply an increase pressure to the material in the portion of the suction line which is closed off during this pressure stroke so that it in effect can "blow back" material in this line between the valve and the supply vessel and thereby prevent clogging in the manner described. A further advantage of this system, of course, is that it simplifies the pipe and duct connections and the amount of piping and ducting which may be required.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
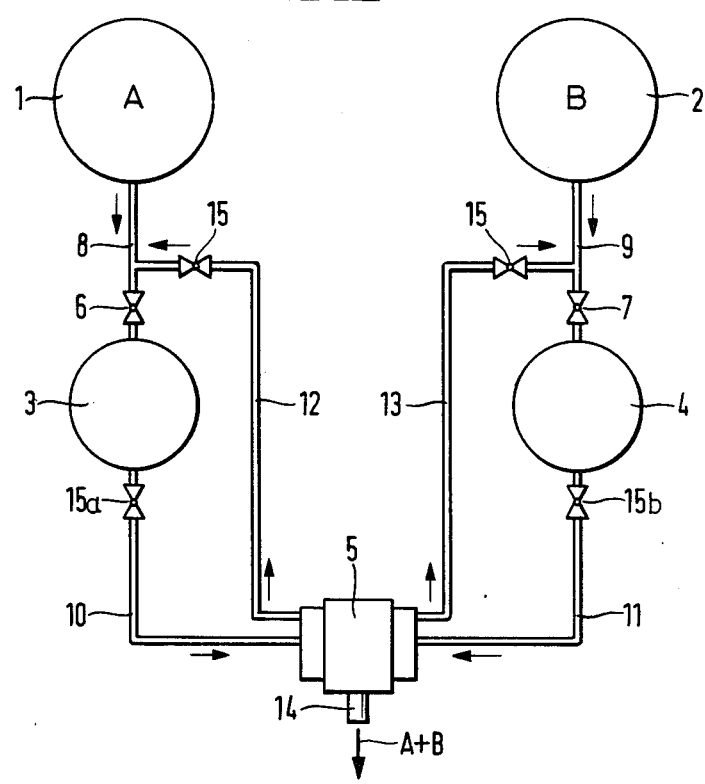
FIG. 1 is a diagrammatic illustration of the flow path of an apparatus according to the present invention.

In FIG. 1, I have shown two supply vessels 1 and 2 for two synthetic resin components A and B which can be combined and which interact to produce, for example, nylon or polyurethane.

At least one of these components may be highly filled with a pigment, reinforcing solid or the like in particulate or fibers form and, more specifically, may be filled with reinforcing glass fibers.

Each of the supply vessels 1, 2 is connected with a respective metering piston unit 3, 4 and the two metering piston units 3, 4 are connected to a mixing head 5.

The mixing head 5 may be of the type described in the aforementioned U.S. patent and each of the metering piston units may correspond to the metering piston unit of this patent.

The connection between each supply vessel 1, 2 and the respective metering piston unit 3, 4 is via a respective duct 8, 9, provided with a controllable passage-blocking unit 6 or 7 in the form of a valve.

The connection between the metering piston unit 3 and the corresponding unit 4 for the other component and the mixing head is effected via lines 10 and 11.

From the mixing head, recirculating or recycling lines or ducts 12 and 13 return via valves 15 to the ducts 8 and 9 immediately upstream of the valves 6. Consequently, as will be apparent in the following discussion, when the valves 6 and 7 are closed and valves 15 are open and the metering piston units 3, 4 are effective to displace the respective components at relatively high pressure to the mixing chamber, any excess of the component passes into the lines 8 and 9 and drives material back to the vessels 1, 2 preventing clogging of the lines in spite of the fact that the valves 6 and 7 are closed.

Figure 2:
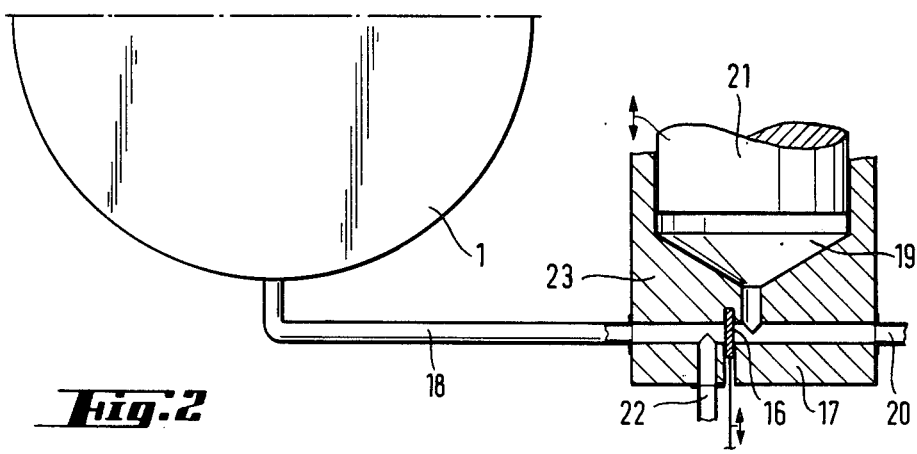
FIG. 2 is a detail view illustrating a feature of the invention, parts being illustrated in section.

As can be seen from FIG. 2, in a practical embodiment of the construction of the valves and the junctions between the recirculation lines and the suction lines, each metering piston unit can comprise a metering piston 21 whose intake stroke can represent an upward movement of the piston and whose discharge stroke is represented by a downward movement of this piston.

The piston 21 works with a metering piston chamber 19 which is enlarged during the suction stroke and reduced during the pressure stroke. During the intake stroke, the material can be drawn from the supply vessel, e.g. the vessel 1 by the respective suction line which in FIG. 2 is represented at 18. When this suction line is closed and during the pressure stroke, the material is forced from the chamber 19 via the respective line connected to the mixing head 5, e.g. the line represented at 20.

As has been illustrated in FIG. 2 in some detail, the line 22, representing the recirculation line for each component, opens into the line 18 at the bottom of the metering piston unit 23 close to the junction of the communication between the chamber 19 with this line and the valve, represented by the shutter 16 is provided at the bottom 17 of this unit as well as close as possible to the point at which the two junctions are formed with the line 18.

In operation, therefore, during the suction stroke, the valves 6 and 7 are opened and the respective components are withdrawn from the respective supply vessels 1 and 2 via lines 8 and 9. During this operation, the valves 15a and 15b are usually closed. Alternatively, the mixing head piston can block lines 10 and 11 and permit recirculation to lines 12 and 13 which may be closed via the valves 15 previously described.

During the following or mixing phase, the valves 6 and 7 are closed, valves 15a and 15b are opened, the piston of the mixing chamber is withdrawn at least in part, and the metering pistons of the two units 3 and 4 are displaced to drive the respective components via lines 10 and 11 into the mixing head from the which the mixture a+b is discharged at 14 into a mold cavity in the manner described in the aforementioned patent. During this mixing phase, any excess of the respective components is recirculated via lines 12 and 13 and the open valves 15 into the lines 8 and 9 to drive back the material in these lines and prevent clogging.

As can be seen from FIG. 1, the entire length of the suction ducts 8 and 9 above the valves 6 and 7 are thus prevented from developing clogs or obstructions and in the embodiment of FIG. 2, the entire length of the duct 18 is prevented from developing such clogs.

Clogs are prevented during the suction phase because these ducts act as the suction ducts and are prevented during the pressure or mixing phase because of the partial recirculation via lines 12 and 13.

The valves 6, 7 and 15, 15a and 15b can be check valves if desired, i.e. unidirectionally effective valves that require no control means for the closure thereof.

I claim:

1. An apparatus for forming a mixture of at least two synthetic resin components, comprising:
    a mixing head having an inlet for each of a plurality of components, an outlet for a mixture of said components, and a recirculation port enabling the recirculation of each of said components;

a respective supply vessel for each of said components communicating with the respective inlet, at least one of said supply vessels being provided with a metering pump between said one of said supply vessels and the respective inlet, said metering pump having a suction side connected with said one of said supply vessels by a respective duct and a discharge side connected with the respective inlet of said mixing head;

a two-way duct valve means in said duct proximal to said suction side of said pump; and a line having a two-way line valve means at an end thereof connecting the recirculation port of the component of said one of said vessels with said duct at a location proximal to said duct valve and spaced from said one of said vessels so that, upon recirculation of said components by closure of said duct valve the component of said one of said vessels is fed back into said one of said one of said vessels by said pump through the portion of said duct between said location and said vessel, thereby precluding obstruction of said duct.

2. The apparatus defined in claim 1 wherein each of said lines connecting the respective recirculating port with the respective duct opens into said duct proximal to the respective metering piston unit.

3. The apparatus defined in claim 2 wherein said metering piston unit has an upright configuration and the respective duct valve is provided at the bottom of said unit.

4. The apparatus defined in claim 1 wherein each of said supply vessels is provided with a respective metering pump in the form of a respective piston unit and a respective duct connecting same to the respective supply vessel and each of said recirculation ports is connected to the respective duct upstream of a respective valve proximal to the respective piston unit.

5. The apparatus defined in claim 4 wherein each of said lines connecting the respective recirculating port with the respective duct opens into said duct proximal to the respective metering piston unit.

6. The apparatus defined in claim 5 wherein each of said metering piston units is upright and has the respective duct valve provided at the bottom thereof.

* * * * *